Jan. 30, 1945. G. H. KENDALL 2,368,549
FLANGED BEARING
Filed Jan. 13, 1944 6 Sheets-Sheet 1

INVENTOR
George H. Kendall
BY
Wooster & Davis
ATTORNEYS

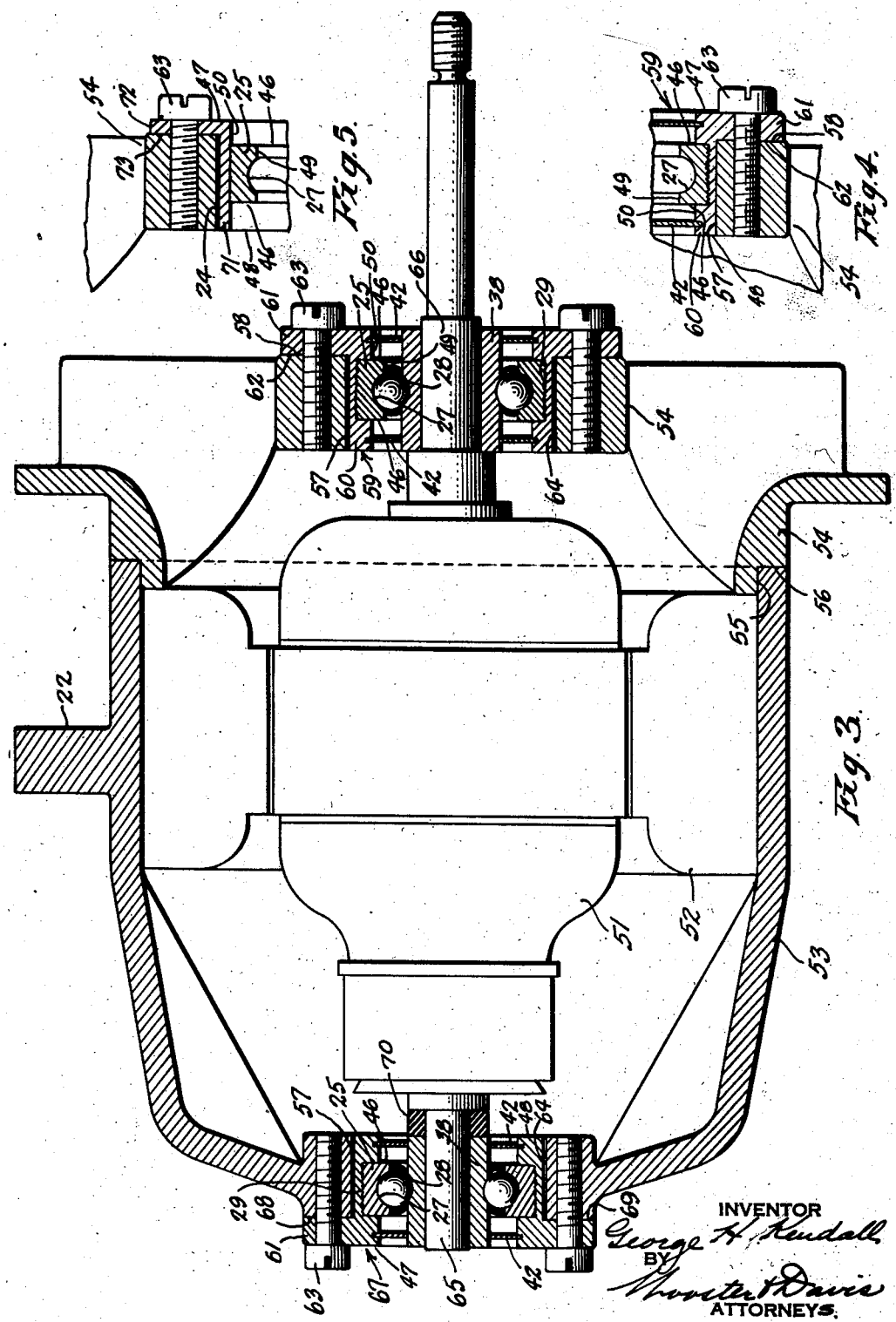

Jan. 30, 1945.   G. H. KENDALL   2,368,549
FLANGED BEARING
Filed Jan. 13, 1944   6 Sheets-Sheet 3

INVENTOR
George H. Kendall
BY
ATTORNEYS

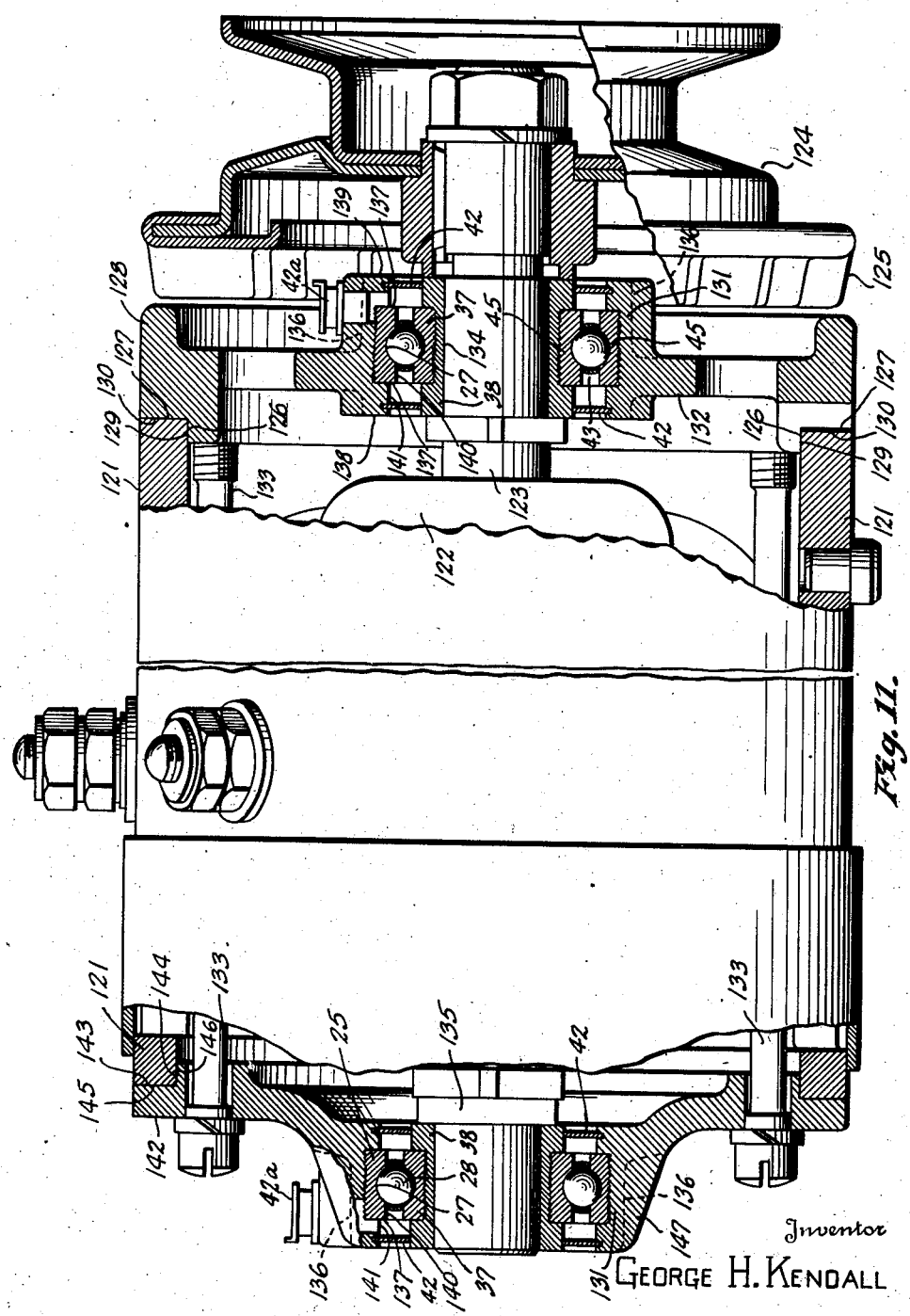

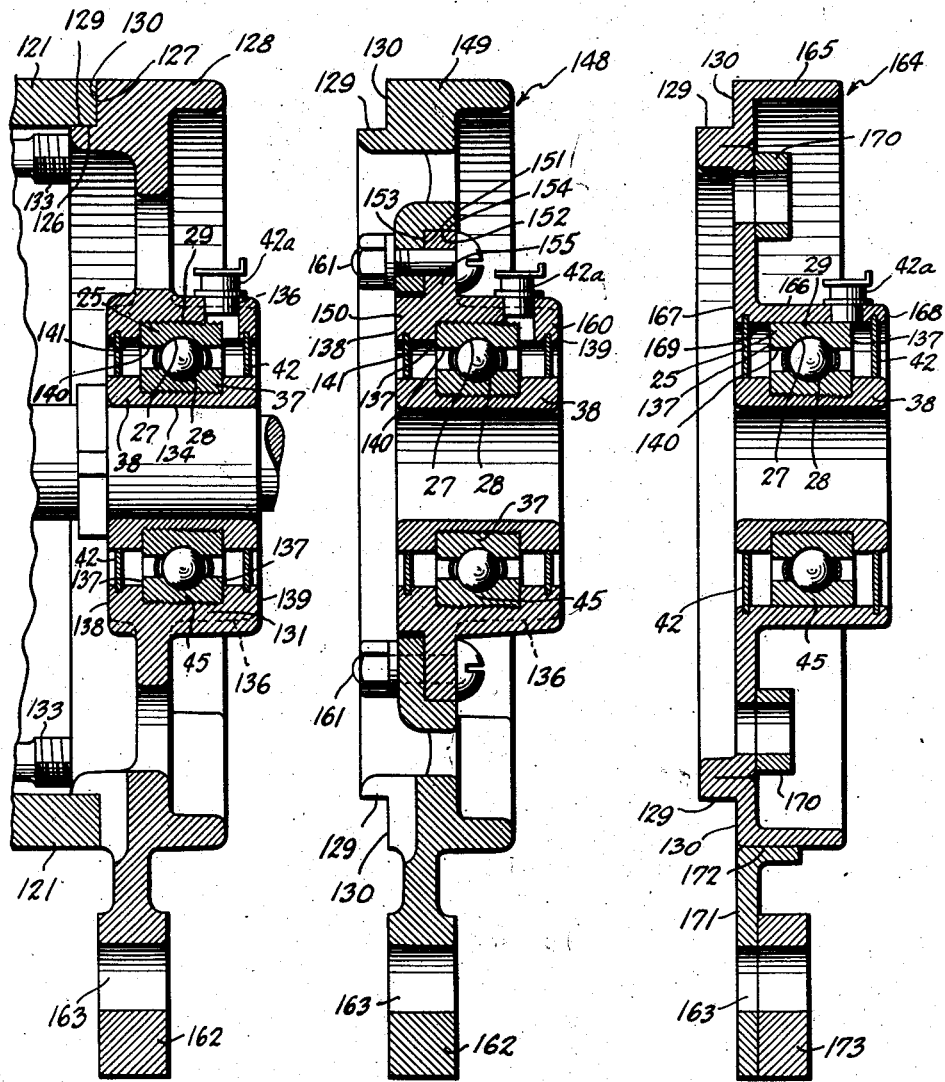

Jan. 30, 1945.　　　G. H. KENDALL　　　2,368,549
FLANGED BEARING
Filed Jan. 13, 1944　　　6 Sheets-Sheet 6

Inventor
George H. Kendall
By Wooster & Davis
Attorneys

Patented Jan. 30, 1945

2,368,549

UNITED STATES PATENT OFFICE 2,368,549

FLANGED BEARING

George H. Kendall, Noroton Heights, Conn., assignor of one-eighteenth to Elizabeth B. Dickson, one-eighteenth to T. C. Dickson, Jr., two-eighteenths to E. W. Bassick, Jr., one-eighteenth to Christine N. Bassick, one-eighteenth to Marshall M. Bassick, one-eighteenth to Paulina M. Bassick, one-eighteenth to Grace M. Bassick, and one-eighteenth to E. W. Bassick, all of Bridgeport, Conn.

Application January 13, 1944, Serial No. 518,190

12 Claims. (Cl. 308—178)

This invention relates to antifriction bearings for various machines including ball bearings for small size applications such for example as small motor and generator antifriction bearing structures, particularly high speed devices of this type, as well as heavy duty types of bearings such as the various so-called roller type of bearings using flat or cylindrical, tapered and similar types of rollers, and has for an object to provide an improved and simplified construction which will eliminate the multiplicity of chucking errors involved in the manufacture and mounting of the standard type of antifriction bearings now generally employed for these devices, and particularly to form a construction in which the supporting and locating surfaces for the bearing are in exact alignment with the bearing raceway surfaces; that is, to provide a substantially one-piece construction in which the errors of eccentricity of a plurality of parts which do not have their high points of eccentricity at the same line of assembly are eliminated. In the same way the errors of wobble of each of a plurality of parts are eliminated.

The primary object is to provide a bimaterial construction in which the supporting surface is in exact radial and axial concentric alignment with the raceway or track surface for the rolling elements.

Another object is to eliminate cocking of the bearing outer ring in the machine housing or frame bore, which is a common fault of the bearings now generally employed for these devices.

A further object is to provide a construction in which a large number of the many machining operations in making the bearings and housing or frame fits, etc., are greatly reduced or eliminated, thus greatly reducing the number of parts required for making the complete assembly as well as reducing the time required for making and assembling, and, therefore, not only increasing the accuracy with a much smaller percentage of rejections, but also greatly reducing the cost of the bearing and its assembly in the housing or frame structure of the motor, generator, or other machine.

A still further object is to provide antifriction mountings for the shafts of various devices, particularly automobile generators and similar devices, in which the antifriction bearing construction is a part of the housing or frame construction of the device, such for example as the automobile generator, or the bearing and its mounting forms a section of the housing or the frame.

Another object is to form a construction in which one section of the housing or frame has a supporting surface accurately located and aligned with respect to the axis of the shaft and a section of the housing forming a part of the antifriction bearing is provided with a complementary locating surface accurately positioned and aligned with respect to the track or raceway for the rolling elements. That is, this locating surface is in exact radial and axial concentric alignment with the track or raceway so that when this section is mounted on the supporting surface the raceway or track is automatically accurately positioned and aligned with respect to the housing and the shaft.

With the foregoing and other objects in view, I have devised a construction some embodiments of which are illustrated in the accompanying drawings forming a part of this specification, it being, however, understood that the invention is not limited to the specific constructions and arrangements shown but may involve various changes and modifications within the scope of the invention.

In these drawings:

Fig. 3 is a longitudinal section through one type of a horizontal high speed motor with my invention;

Fig. 4 is a detail section through a portion of the bearing showing a slight modification;

Fig. 5 is a similar section showing another slight modification;

Figs. 6 to 10 show how the invention may be employed in different types of machinery, such as farm machinery on combines, tractors, threshers, etc., as well as on machine tools and process machinery and so forth, to hold and locate shafts of all kinds in a machine housing or frame, and where necessary to allow for expansion, shift or weave of machinery in operation. These include heavy duty applications.

Figure 6:
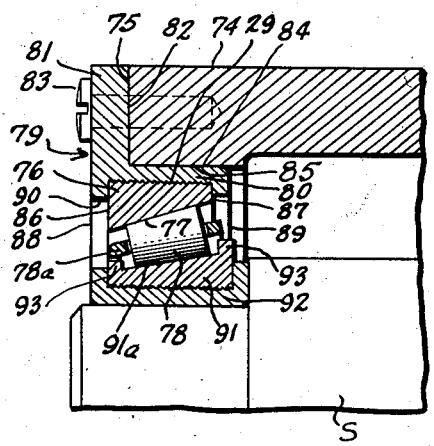
Figure 7:
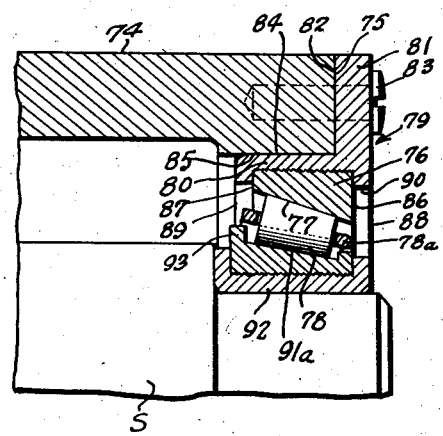
Figure 8:
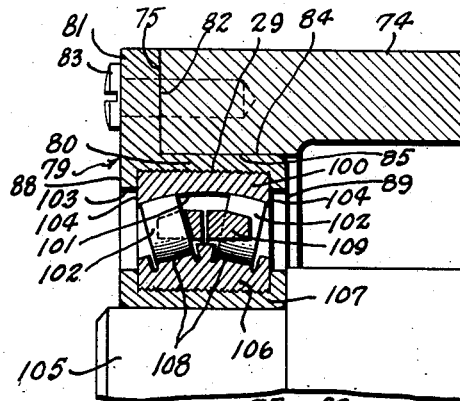
Figure 9:
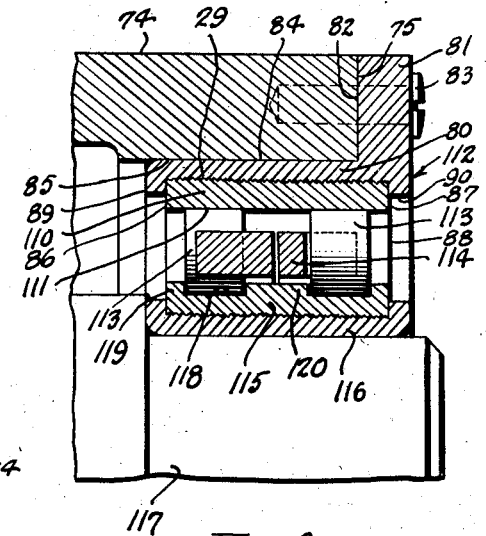
Figure 10:
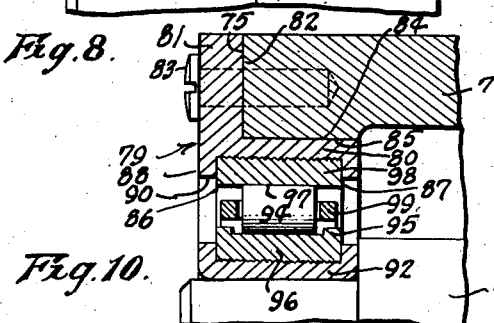

Fig. 6 is a section through a portion of an opposed mounting for a shaft showing the bearing and a portion of the machine housing or frame at one end of the shaft;

Fig. 7 is a similar view showing the bearing at the other end of the shaft;

Fig. 8 is a similar section of a portion of a spherical roller type of bearing;

Fig. 9 is a similar section of a floating bearing;

Fig. 10 is a section of a bearing similar to Fig. 6 but using flat or cylindrical rollers;

Fig. 11 is a partial side elevation and a partial section of one of the more popular types of automobile generators or starting motors now generally employed, showing my improved construction applied thereto;

Fig. 12 is a longitudinal section through the combined housing section and bearing at one end of the housing;

Fig. 13 is a similar section showing a somewhat modified construction of the combined housing section and bearing;

Fig. 14 is a similar section of another modified construction, and

Figure 15:
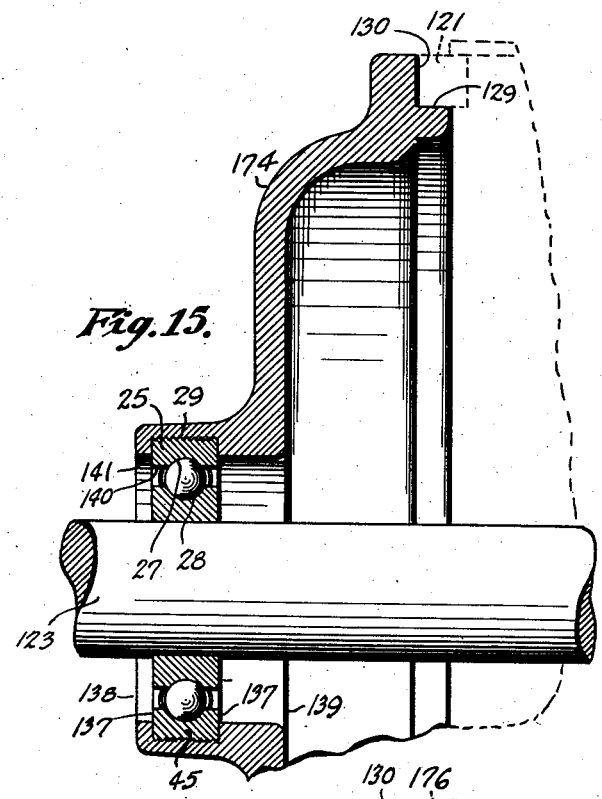
Figure 16:
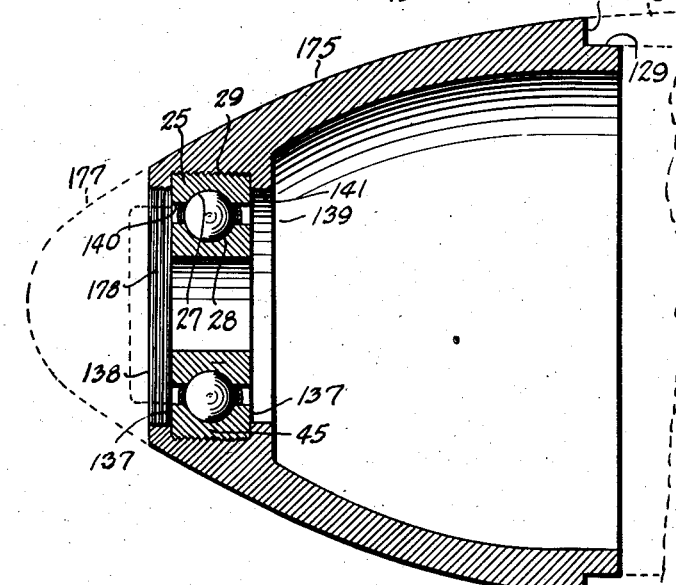

Figs. 15 and 16 are sections through further modified constructions showing how the mounting flange of the bearing forming also the end frame of the machine or motor may be given various shapes for design purposes and also locate the raceway at practically any desired location to one side or laterally of the plane of the mounting and locating surfaces.

This application is a continuation in part of my prior applications Serial No. 357,107, filed September 17, 1940; Serial No. 408,267, filed August 25, 1941; Serial No. 429,876, filed February 7, 1942, and Serial No. 429,878, filed February 7, 1942.

In Figs. 1 to 5 and 11 to 16 of the drawings a ball bearing is illustrated, but the construction is equally adapted for use with any type of ball bearing, either single or double row, and all types of roller bearings, such for example as flat or cylindrical rollers, tapered, thrust, or any other type as may be best suited to particular applications.

The present standardized antifriction bearing construction consists of two special alloy steel rings between which the rolling elements run and hardened and normalized to produce an extremely hard surface for the balls or other rolling elements to roll upon in carrying the load. This extreme degree of hardness was found to be of first importance to carry the rated load of the bearing and as necessary to prevent damage to the ring raceways by denting from the ball or roller, or by imprinting from them through rough handling or abuse of the equipment in which the bearing was mounted. This will be readily apparent when it is realized that there is a very small area of the ball or roller in contact with the raceway surface which must carry the load imposed.

The manufacture of these bearings involves turning the bearing rings of very tough steel from heavy bars, forgings or from very heavy steel tubes, with a waste of nearly one-half or over (depending on the size) of the weight of the steel in chips, cut-off ends, etc. Furthermore they require many additional finishing operations, including a large number of chucking operations as well as actual work on the metal surfaces to bring the piece to the finished size.

The mounting of such bearings in the types of small motors and generators now generally employed comprises a complicated construction involving a large number of parts, a common structure involving a cupped type mounting including a number of stamped, drawn and formed parts, which require a number of chucking and other operations, not only in manufacturing but also in assembling. These multiple operations introduce many errors and variables, such for example as those of wobble and eccentricity which are cumulative and show up in the finished assembly. These obviously make it very difficult or next to impossible to assure exact alignment of the bearing ring and accurate mounting of the bearing in the housing in relation to the other parts, and it will be evident that with the small variations of so many parts the manufacturing burden of holding tolerances on them is enormous.

My invention eliminates the greater proportion of these variations and difficulties both in manufacturing and assembling. I have found that a raceway surface can be provided and maintained at the present necessary degree of hardness in a ring of the special tough steel of a thickness, as provided by the stress formulas of Streibeck and Hertz, to carry the rolling load, and that the small balance of the usual size bearing ring shape can be made of softer and more readily workable material than the tough machining alloy steel at present used in the solid bearing members, as the load carried by the raceway ring would be distributed over large areas. Because of this construction the remaining portion of the bearing carrying the raceway ring can be formed or molded and thus extended to the shape and size of the mounting for the bearing, which may be directly located and mounted on the housing of the motor or generator, or machine housing or frame.

Thus this raceway ring of tough hardened steel or similar material can be cast or molded in a supporting or mounting ring member, which is also formed with a mounting flange or similar portion having a face or surface accurately located with respect to the surface of the raceway for the rolling elements. This mounting face or surface may be seated on and accurately aligned and located on an accurately located mounting surface on the housing or frame, so that the simple operation of placing this ring assembly and mounting it on such surface on the housing or frame may be easily and quickly performed and will insure accurate and proper locating and aligning of the bearing, and particularly the raceway for the rolling elements, in the housing or frame and in relation to the other elements of the motor or machine. Thus this raceway ring of tough hardened steel or similar material can be cast or molded in a supporting or mounting ring member in a die-casting machine, plastic molding machine, by the permanent mold method, or the centrifugal mold method, to produce an integral bearing ring which may be directly mounted and accurately located in the housing or frame and having an insert raceway ring of the necessary hardness and toughness. This permits the use of softer and cheaper material for the cast or molded or otherwise formed ring support, and the insert raceway ring of tough hardened steel or similar material can be cast or molded into this material or otherwise permanently bonded thereto and properly and accurately positioned and anchored in or bonded to the supporting material by the casting and molding operation, or bonded by some other means to a preformed supporting and mounting ring member, such for example as copper brazing in a controlled atmosphere. This construction eliminates a large number of chucking and finishing operations required in making the standard antifriction bearing, insuring greater accuracy with less difficulty and liability of error, particularly the proper locating of the raceway for the rolling elements with respect to finished surfaces of the housing or frame, giving a better and more reliable construction and one which can be manufactured and assembled at much less cost. This is particularly important as giving quiet, smooth and vibationless operation at high speeds.

Figures 1, 2:
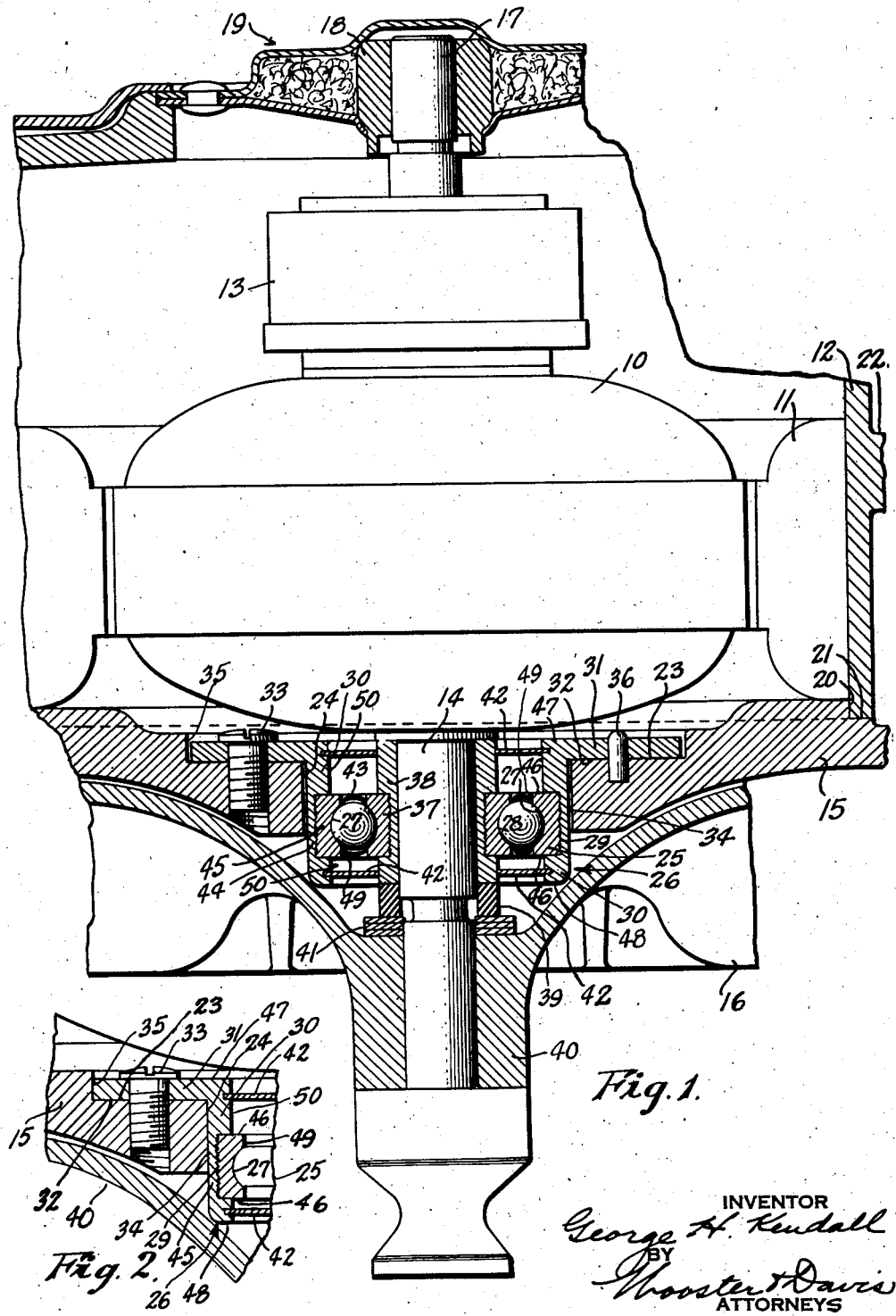
Fig. 1 is a vertical section through a portion of the housing of a typical high speed vertical axis fan motor showing how my improved construction may be incorporated therein.
Fig. 2 is a similar section through a portion thereof showing a slight modification.

Referring to the drawings, Fig. 1 shows this construction as applied to a typical high speed vertical fan motor. Only a portion of the housing and fan is shown to illustrate the construction, the remainder being broken away to simplify the drawings. In this motor the rotor is indicated at 10 running within the stator elements 11 mounted in the section 12 of the enclosing housing. The motor may be any D. C. or alternating current motor, the member 10 being the armature having its windings suitably connected to the segments of the commutator 13 rotating with the armature, and the stator 11 comprises the field magnets and the exciting coils. The brushes and other elements are not shown. The rotor is on the shaft 14 which extends through the lower end wall or section 15 of the housing and carries any suitable type of fan 16. In this type of motor the upper end 17 of the shaft is usually mounted in a self-lining oilless bearing 18 in a suitable cup mounting 19.

The lower bearing is an antifriction bearing mounted in the end section 15 of the housing. This section has accurately finished annular surfaces 20 and 21 to fit similarly finished surfaces on the end of the housing section 12 to accurately mount the end section in the main body section, and the sections then are secured together by any suitable screws or bolts, not shown. The section 12 may also have a suitable mounting flange 22 for supporting the whole assembly on a suitable mounting.

The end section 15 has a mounting surface 23 bored and finished in exact or accurate relation and alignment to the surfaces 20 and 21, and also with relation to the opening 24 through this end section. This surface surrounds the opening and extends transversely of the axis of the shaft 14 and is at right angles thereto. The outer portion of the antifriction bearing comprises the raceway ring 25 and the supporting and backing ring section 26, the insert ring 25 forming a raceway track 27 for the balls or other rolling elements 28. This ring 25 is mounted in and permanently bonded to the ring section 26. It is ordinarily made of the special tough steel alloys now generally employed for the ring members of the standard ball and roller bearings, and which can be treated to give the necessary hardness to the surface on which the rolling elements roll. These rings can be cut from steel tubing of the proper size and formed to shape or they may be made from strip steel rolled into a circle and welded at the abutting ends to make a one-piece solid ring, or made from flat wire or sheet, or seamless swaged or welded pipe or tubing, which illustrate some of the possible forms of fabrication. They can also be made by cold forming, or hot or cold steel fused at the ends to make a fully continuous ring, by stamping, turning or forging methods, etc., as may best lend itself to the particular size, quantity, application, or condition of manufacture. The ring is properly finished and hardened and then is held in the proper location in the mold by suitable holding and locating means, and the other material forming the backing and supporting material of the member 26 is poured into the mold about the ring with suitable pressure. This material may be cast or molded about the ring in any suitable manner, such for example as in die-cast molds in die-casting machines, suitable molds in plastic molding machines, by casting in permanent molds, by casting by centrifugal mold methods or powdered metal pressure molding or casting. It is preferred that the surface of the insert ring 25 at the opposite side from the rolling track for the balls or other rolling elements be knurled or otherwise roughened, as indicated at 29, so that the cast or molded material will run into the depressions in the knurled or roughened surface to form a better bond between the insert raceway ring and the backing up or mounting material. Thus the raceway ring is permanently bonded to the backing and supporting ring section so that it cannot be shifted or removed. Another way in which the ring may be mounted and permanently bonded to the backing and supporting ring section is by preforming the section and securing the ring thereto through copper brazing in a controlled or neutral atmosphere, as described in the prior applications above noted, and as illustrated in Fig. 5 of the present drawings.

The backing and supporting member 26 includes a circular ring portion 30 and a flange portion 31 integral with the central ring section 30 and projecting laterally outward therefrom at the outer side thereof. This flange has a mounting face or surface 32 accurately positioned and aligned with respect to the insert ring 25 and particularly the raceway surface 27 thereof, and this accurate relative location and alignment of the two surfaces 32 and 27 can be readily secured and maintained in the molding or casting operation with practically no finishing operation. In the final finishing the flange 31 can be clamped in the chuck or holder or against the table of the machine and then the track surface 27 ground to the desired finish and size. Thus with this construction the track surface can be readily finished in exact radial and axial concentric alignment with the mounting surface 32, or vice versa, the surface 32 is located in exact radial and axial concentric alignment with the track surface 27, because the required finishing may be done with a single chucking operation, or in a single set up. The assembled bearing section comprising the members 25 and 26 can be quickly and accurately mounted in the housing member 15 by merely placing the flange on the mounting surfaces 23 and securing it thereon by any suitable number of screws 33. The clearance 34 between the opening 24 in the end wall 15 and the ring portion 30 is exaggerated on the drawings, it being preferably very small, only two or three thousandths of an inch. It therefore requires only rough finishing and does not require accurate machining, and the opening 24 acts as a rough centering means for the bearing at the time of assembly. The surface 35 of the housing at the rim of the flange 31 has a diameter to give about the same clearance and therefore no finishing machine work is necessary. With these clearances the bearing element is accurately located by suitable locating pins 36 and the screws hold it in this position. The bored surface 23 is in accurate and exact alignment with, or that is, exactly and properly located with respect to the two end surfaces 20 and 21 of the housing, and proper aligning of the surface 32 on the flange 31 with respect to the raceway 27 can be positively assured in production. Therefore, when the bearing is assembled in the end section of the housing it is automatically accurately located and aligned with the finished surfaces of the housing and the elements located and mounted therein.

If desired, there may be left no clearance at 34 or 35. In other words, the surfaces 34 and 35 can be accurately machined so that either one or both could be used as the accurate centering means for the bearing while the surfaces 23 and 32 accurately locate and line up the bearing in the other direction. This is illustrated in Fig. 2 where there is no clearance shown between the opening 24 or the surface 35 and the ring member 26. An especially important feature is the locating of the surface 32 in exact alignment or desired relation with respect to the raceway 27. The contacting surfaces at 20 and 21 on the housing section 15 are bored and finished at the same time with the surface 23 so that they are in exact alignment, parallel and concentric.

The inner portion of the antifriction bearing comprises the insert ring 37, which may be the same as the ring 35 only reversed, and the backing and supporting member 38 cast or molded about the ring 37 and permanently bonded thereto in the manner described in the applications above identified. This inner section is mounted on the shaft 14 and of course completes the inner portion of the antifriction bearing. In this type of device a rubber or other compressible element 39 is mounted between the bearing and the member 40 mounted permanently on the shaft to allow for longitudinal expansion and contraction due to changes of temperature or other reasons, or it could be spring washers 41. A suitable lubricant may be packed and retained in the bearing by suitable seals 42 which will also keep out dirt and fluids which might interfere with proper operation of the bearing. The balls 28 are shown in the usual retainer 43 such as used in standard ball and roller bearings, comprising for example two strips of steel stamped from sheet metal and formed and secured together by rivets or other suitable means (not shown) to retain the balls in proper alignment. These retainer elements can be made from strip metal formed to shape and their free ends welded or soldered to make continuous rings and eliminate the waste incident to stamping them from sheet metal. This retainer can be omitted if desired, as where the balls are in contact.

This process and construction uses the same basic function for its bimetallic and bimaterial construction as the present standardized antifriction bearing construction as far as sizes and materials of the raceway, balls and retaining elements are concerned. That is, no attempt is made to alter the function or performance of the balls or rolling elements.

The improved bearing steels of today make possible far greater load-carrying capacity for a given bearing size load rating so successfully established and accepted by all industries over the entire world. These established sizes therefore do not require a bearing ring thickness as great as when the sizes were initially established. A small part of the standard sized ring may therefore be made of other material without affecting the proper raceway load-carrying function. Thus in this construction the small balance (represented by the portion 44) of the standard section over that of the raceway ring is supplied by softer and more easily workable material, yet fully capable of conservative support of a required load, making possible major reduction in the cost of fabrication of the bearing, including such as cylindrical, needle, spherical, conical or tapered rollers, as well as balls. The insert ring 25 of hardened metal is made of a thickness at its thinnest point 45 to carry the rolling load as conservatively figured by the established formulas of Streibeck and Hertz for standard solid one-piece bearings, so that this insert ring is capable of carrying the normal rolling load independently of the backing or supporting member.

It will be seen that the insert ring 25 forming a raceway for the rolling elements is of less width than the supporting or backing member 26, so that the sides 46 of the insert ring are spaced inwardly from the sides 47 and 48 of the backing member. It will also be noted that the diameter of the face 49 of the insert ring on which the raceway or rolling surface 27 is located is of a different diameter from that of the adjacent surfaces 50 of the backing or supporting ring member with which it is associated, so that this face of the insert ring is spaced above or inwardly of that of the backing member. This arrangement eliminates the necessity of accurately finishing and lining-up the side surfaces 46 of the insert ring, doing away with a large number of chucking operations required in finishing the one-piece solid bearing now generally employed. The elimination of a large number of chucking operations thus greatly reduces the cost of manufacture, increases the percentage of bearings which are constructed to the proper dimensions, thus decreasing the percentage of rejected bearings, and secures the necessary accuracy with less difficulty.

Because the face 49 having the track or raceway is spaced above the adjacent surfaces 50 of the backing member a portion of each side of the insert ring is exposed and not covered by the metal or material of the backing member. These uncovered surfaces are important as providing gripping surfaces to be properly gripped and hold the insert ring in the die by suitable holding means during the casting and molding operation, and also for later grinding and finishing of the raceway. If the insert ring is merely slid or forced onto the die pin, it is very apt not to be held in the proper position during the casting or molding operation, because as soon as the hot metal or other material hits it it is heated and expands faster than the large bulk of the die pin, and therefore the ring loosens on this pin and is liable to be tilted sideways and otherwise forced out of position by the pressure of the material or the metal forced into the mold. With this present construction the insert ring can be gripped and held in the mold by its opposite sides 46 with no danger of its being loosened by heating from the die-casting metal or other material and then forced out of position by the pressure of this metal or other molding material.

Because the ring can be so gripped and held, either during molding or casting operations or for finishing of the raceway, a large number of chucking operations are avoided which are necessary in the solid or one-piece bearing now generally employed, and also required of the complicated multi-piece mounting now generally employed for mounting the standard bearing in the motor or generator housings, thus doing away with a large number of variables in the standard bearing and its mounting that cause such unsatisfactory performance as to lead to rejection by the customer. Basically, these variables are due to the many chucking operations required for the many step-by-step operations needed in finishing the bearing ring of the present standard methods of ball bearing manufacture, and also the variables and errors caused by the many chucking and finishing operations in making the multiple parts of the mounting for these bearings in the motor or generator housing. These errors or variables are cumulative, resulting in misalignment, cocking of the bearing wobble and eccentricity, etc. This also applies to all types of ball, roller and thrust bearings. It will be evident that the diameter surfaces of the rings must be parallel, that the ring surfaces must be parallel, and that the raceways must be parallel with both faces and diameter, and that all must be concentric (not eccentric) with each other for uniform or successful bearing performance. If these qualities are not rigidly maintained, wobble of the rings, of the faces, of the diameters, or other errors or combinations of these faults will quickly cause bearing failure and wrecking of the bearing.

With the present construction the bearing may be gripped and held by the surfaces 46 on the opposite sides of the track or raceway ring during the final finishing and grinding of the mounting surface 32 and the track surface 27. Therefore these surfaces can be readily finished in exact radial and axial concentric alignment with each other as they are finished in the same chucking operation. The mounting surface is therefore in exact radial and axial concentric alignment with the track surface.

In the present construction, the backing-up member 26 and the raceway ring 25 form a standard proportioned bearing with the backing or outer section cast, molded or bonded to the raceway ring and having integral therewith the mounting flange so that the mounting surface is exactly positioned with reference to the raceway surface for the rolling elements. This is a simple construction in which a large proportion of the finishing operations required in the usual construction of the bearing ring and the mounting for the bearing in the housing are eliminated. At high speed this invention provides a far greater degree of smoothness of operation, as a great proportion of all factors of machine error, such for example as wobble and eccentricity, are entirely eliminated.

Fig. 3 shows how this construction can be employed in high speed horizontal motors or generators, the construction being basically the same as that of Fig. 1. In this device the armature is indicated at 51 running in the field of elements 52 in the housing comprising the main section 53 and the end section 54. This section has bored and finished angular surfaces 55 and 56 to receive and fit similar finished surfaces on the end of the section 53, the two sections of the housing being secured together by suitable screws or bolts (not shown). The end section 54 of the housing has a cylindrical opening 57 concentric with the surfaces 55 and 56 and corresponding to the opening 24 in Fig. 1. Surrounding this opening is the finished supporting surface 58 corresponding to the supporting surface 23 of Fig. 1.

The outer section of the antifriction bearing comprises the insert raceway ring 25 mounted in the outer ring section 59 the same as described in connection with Fig. 1. This outer ring section comprises the cylindrical or central ring section 60 and the integral flange portion 61 extending laterally on the outer side thereof corresponding to the flange portion 31 of Fig. 1. This flange portion has the finished face or surface 62 exactly and accurately positioned and aligned with respect to the raceway 27 to fit onto the supporting surface 58, this surface 62 corresponding to the surface 32 of the first arrangement, and this flange portion is secured to the housing by any suitable number of screws 63. There may be a slight clearance 64 between the outer ring section and the opening 57, the same as in the first form, or the opening 57 may be accurately bored and finished to fit the outer surface of the ring section 60 to accurately center and position it, as indicated in Fig. 4.

The bearing is thus substantially the same as that of Fig. 1 and the section 59 is molded or cast or otherwise formed about the raceway ring 25 and permanently bonded thereto, the same as described in connection with Fig. 1, the surface 62 being accurately positioned and aligned with respect to the raceway 27 during manufacture in the same manner. The surface 58 of the housing is also bored and finished at the same time with the surfaces 55 and 56 so that it is accurately located and aligned with respect to these surfaces, and therefore when mounting the bearing section in the housing the raceway is automatically accurately mounted in the proper relation and alignment with the finished surfaces of the housing and accurately centered with respect thereto.

In this construction the same construction of bearing is used for the other end 65 of the shaft 66, and it is mounted in the opposite end of the section 53 of the housing in the same manner as shown at the right in Fig. 3. In this construction the outer bearing 67 is the same as corresponding element 59 except somewhat smaller in diameter. The mounting surface 68 on the housing corresponds to the surface 58 and is bored and finished with the surfaces on the section 53 fitting the surfaces 55 and 56 and is bored or turned at the same time with these surfaces so as to be accurately located, aligned and centralized with respect thereto to cooperate with surface 69 on the bearing corresponding with the surface 62, to accurately locate, align and centralize this bearing.

In constructions where two ball or roller bearings of any type are used it is necessary that some compressible means be provided to take up part variations and expansions as may occur during operation or from change of temperature. Such an element is shown at 70. It may be a spring or resilient material such as rubber, etc.

In Figs. 6 to 10 are shown examples of how the invention may be employed in different types of machinery, such for example as farm machinery including combines, tractors, threshers, etc., as well as on machine tools and process machinery and the like to hold and locate shafts of all kinds in a machine housing or frame, or other supporting unit, and where necessary to allow for expansion and shift or weave of machinery in operation. The invention does not change the basic principles of these mountings, but makes them more simple and easy to use and to assemble in the field as well as in the shops where they are initially manufactured or used. Standard bearing proportions are used with backing rings as part of the outer ring section of the bearing and made to the shape that is most adapted for the particular application. In these applications, as well as those disclosed in Figs. 1 to 5, considerable machine work in manufacturing machining operations as well as in assembly fitting operations is completely eliminated by these constructions.

Fig. 6 illustrates the mounting at one end of a shaft forming an opposed mounting for the shaft S. The construction of Fig. 7 shows the mounting at the other end of the shaft, which is the same as Fig. 6 except that it is reversed. In this construction the adjustment and thrust are assumed by one or both of the bearings which are of the taper roller type. In these figures the frame or housing of the machine is indicated at 74 which is provided with the supporting surface 75 bored and finished so that it is accurately positioned and aligned with respect to the shaft and corresponds to the supporting surfaces 23, 58, etc. of Figs. 1 to 5. The antifriction bearing comprises inner and outer sections mounted on the shaft and the housing frame respectively, the outer section comprising the raceway ring 76 having the track surface 77 on which the tapered rolling elements 78 roll, and which ring corresponds to ring 25 of the first figures. This is mounted and located in a supporting and backing member 79 corresponding to the supporting and backing members 30, 59, 67 and 71 of the first figures. This includes a ring portion 80 embracing the ring 76 and permanently bonded thereto, the ring 76 being of a thickness to carry the normal rolling load and the portion 80 being of a thickness to bring the bearing to the standard size of the single ring solid bearing. Integral with this ring portion is a flange portion 81 provided with a locating face or surface 82 accurately positioned and aligned with the ring 76 and particularly with the track or raceway 77 and it is seated on the supporting surface 75 to accurately locate and position the bearing in the housing or frame. It is secured or clamped to the housing or frame 74 of the machine by any suitable means such for example as the screws 83. There may be a slight clearance between the outer surface 84 of the ring portion 80 and the inner surface 85 of the frame or housing 74, or this surface can be accurately finished, located and aligned with respect to the track or raceway 77 and the surface 85 also accurately finished, located and aligned with respect to the shaft, so that the cooperation of the two surfaces assists in locating and supporting the bearing.

As in the first forms, the supporting and backing member 79 may be made in the same way, that is by molding, casting, die casting, etc., substantially to finished size and shape and permanently bonded to the ring 76, the same as described in connection with Figs. 1 to 5. The ring 76 is narrower than the ring section 80 so that the side walls 86 and 87 of the rings 76 are spaced inwardly of the side walls 88 and 89 of the backing member and the surface of the ring 76 having the track or raceway 77 is of different diameter than the adjacent corresponding surface 90 of the backing member so that the side walls 86 and 87 project above the surface 90 to form gripping surfaces or shoulders for holding the ring accurately in the dies during the molding or casting operation or while finishing the raceway or track surface, the same as described in connection with Figs. 1 to 5. The inclined taper of the rollers and track surfaces can take longitudinal thrust as well as radial bearing and also will permit slight longitudinal adjustment. The inner ring section of the bearing is made in the same way as that described in the prior applications above noted, and includes the track ring 91 and the backing and supporting member 92. The track surface 91a however is inclined or tapered to correspond with the type of roller and may have flanges or lips 93 at the opposite ends to retain the rollers in the bearing, there being preferably, however, a clearance between the ends of the rollers and the flanges. The rollers may be in the usual cage or retainer 78a.

As above indicated, the construction of Fig. 7 is the same as that of Fig. 6 except reversed and therefore the same reference characters are used.

Fig. 10 is the same as Figs. 6 and 7 except flat or cylindrical rollers 94 are used, and in this case also clearance is left between the ends of these rollers and the lips or flanges 95 on the inner raceway ring 96 to allow for expansion or other factors requiring some lateral play in the mounting. The track surface 97 on the outer ring 98 may be flat or cylindrical, also permitting a certain amount of longitudinal adjustment, and permitting the bearing with the shaft to be inserted or withdrawn through the outer bearing section in mounting or dismounting. The backing up member 79 is the same as that of Figs. 6 and 7 and this may be made in the same way. The rollers may be in the usual cage or retainer 99.

In Fig. 8 the invention is shown as applied to the spherical type of bearing in which both radial load and thrust or longitudinal loads may be taken within a single double row bearing. This is a very important bearing in that it may be in certain applications used as the only bearing on a short shaft, such for example as that of magnetos, so that it represents a complete cartridge bearing construction within itself. The outer bearing section comprises the race or trackway ring 100 having the curved track or raceway surface 101, which may be a portion of a sphere on which the spherical rollers 102 run. The backing and supporting member 79 for the ring 100 is the same as that of Fig. 6 and is made and mounted in the same way. It will be noted that the ring 100 is of less width than the backing member 79 and the inner face of the ring on which the surface 101 is located is of different diameter than the face or surface 103 so as to provide shoulders 104 at the opposite ends of the raceway ring for gripping and holding it in manufacturing or finishing operations, the same as described in connection with the other figures. The inner bearing section on the shaft 105 includes trackway ring 106 mounted and bonded to the backing up and supporting member 107, as described in the prior applications. This ring has two trackway surfaces 108 for the rolling elements, and the elements may be kept at proper spacing by the separators 109.

In the self-contained double row bearing, such for example as shown in Fig. 8, this invention makes possible great economies in the limited space available in such cramped design units as modern magnetos for engine or aircraft use. This permits them to be clamped and minutely located or adjusted as one piece.

In all forms shims may be added at 75 between the housing 74 and flange 81 should further individual adjustment be desired.

The construction shown in Fig. 9 shows how the invention may be used for a floating bearing in which lateral play is assured by the flat bearing raceway or track, permitting ready float of the shaft should expansion require it. This raceway ring is shown at 10 having a flat or cylindrical track or raceway surface 111, and is mounted in and permanently bonded to the cast, molded or otherwise manufactured backing up and supporting member 112 corresponding to the member 79 of the other forms. In this case two flat or cylindrical rollers 113 are kept in proper relation by the separators 114 and the inner bearing section comprising the raceway or track ring 115 is mounted in and bonded to the backing up and supporting member 116 mounted on the shaft 117 in the same manner as described in connection with the other figures. This ring 115 has two tracks or raceways 118 one for each of the two sets of rollers 113, with lips or flanges 119 and 120 at their opposite sides to limit lateral movement of the rollers.

In all the cases illustrated the supporting surfaces are in exact alignment and accurately located with respect to the shaft and the raceway or trackway surfaces, thus eliminating a great part of the machining errors of a multiplicity of chucking operations required in the conventional bearing so that perfect functioning of the bearing is assured.

In the case of floating type bearings such as shown in Fig. 9, great convenience is secured for the assembly in that the outer ring may be bolted into place and the bearing withdrawn with the shaft for intermediate assembly operations, yet in the final assembly position the supporting surface or surfaces are always exactly in perfect alignment with the raceway surface, marking a new and distinct improvement in bearing mounting practice. In all the forms the supporting and locating surfaces are in exact alignment with the raceway surfaces and permit rigid fastening of the ring and bearing to the supporting framework, machine or holding unit.

In all the forms shown, instead of having the insert ring 25, 76, 100 and 110 molded or cast in the outer backing or supporting member, it can be located and accurately aligned in a similarly shaped preformed member 71 as shown in Fig. 5, and then permanently bonded to this member at the contacting surfaces by copper brazing in a controlled atmosphere, as described in the prior applications above noted. This bearing has an integral flange 72 corresponding to the flanges 31 and 61 accurately located with the finished surface 73 for mounting on the accurately positioned supporting surface of the housing, the same as in the other forms shown.

In Figs. 11 to 16 is shown how the integral mounting flange for the raceway ring may be extended and shaped to form the end frame of the machine or device with which it is used, such for example as the end frame section of an automobile generator or motor housing.

Referring first to Fig. 11, the central section or sections of the frame or housing of a popular type of automobile generator or starting motor, is indicated at 121, in which is the usual rotor 122 with its associated cooperative parts (not shown) mounted on the shaft 123 projecting through one end of the housing, and on which is mounted the usual operating pulley 124 of any suitable or standard construction, and the fan 125 for causing circulation of cooling air through the device. As pointed out in connection with Figs. 1 and 3, in present constructions, due to the cost of making and assembling and difficulty in getting proper alignment for smooth and proper operation, only one antifriction bearing is employed, that being at the pulley or operating end, while a standard plain bearing is used for the opposite end of the shaft. The usual mounting for this antifriction bearing in the housing comprises a number of separate parts, usually formed stampings, which parts are subject to considerable variation at assembly because the various surfaces of these separate parts cannot be perfectly aligned with the raceways of the standard antifriction bearing (which ordinarily comprise inner and outer solid metal rings having opposed raceways for the rolling elements running between them) and the finished bore of the housing in which it is to be mounted. Various eccentricities and wobble errors in the various previous operations on these plurality of parts do not line up in the same plane and no means are provided in the regular work for so marking these tolerance variable errors. The result is misalignment to a degree causing noisy operation and rejection on the production line of a considerable number of the units, which of course causes considerable loss and increases the cost of production. Thus for example, there may be a multiplicity of errors caused by previous operations which produced stampings that are not flat or free from burrs, and when clamped tight the drawing up of the clamp bolts does not produce an even degree of tightness to assure parallelity and proper alignment of the bearing rings with the supporting surface. These result in various degrees of cocking of the bearing outer ring causing noise and possible rejection of the unit, and this is only one of a number of faults of similar nature in the present constructions that are practically completely eliminated by my improved construction.

Another advantage of my invention is the decrease of time required to assemble a generator or motor over that of the present construction with its multiplicity of parts.

My invention eliminates the greater proportion of these variations and difficulties both in manufacturing and assembling. Because of this novel construction the remaining portion of the bearing carrying the raceway ring can be formed or molded and thus extended to the shape and size of the mounting for the bearing, and thus may form a section or part of the machine or motor or generator housing or frame. In other words the portion of the bearing corresponding to the mounting flange of the forms of Figs. 1 to 10 may be extended and so shaped as to form a section or part of the housing or frame of the machine, and more particularly form the end frame of the housing or the end section of the frame of the machine.

Thus this raceway ring of tough hardened steel or similar material can be cast or molded in a supporting or mounting ring member which forms an integral part of a section of the housing or frame and which section may be provided with a locating face or surface accurately located and aligned with respect to the surface of the raceway or track for the rolling elements. This mounting or locating face or surface may be seated on and by this operation accurately aligned and located on an accurately located and aligned mounting surface on the main or body section of the housing or frame, so that the simple operation of placing this housing or frame section comprising the ring assembly and mounting it on such mounting surface on the main housing or frame may be easily and quickly performed and will insure accurate and proper locating and aligning of the bearing, and particularly the raceway or track for the rolling elements, in the housing or frame and in relation to the other elements of the motor or machine. Thus this raceway ring of tough hardened steel or similar material can be cast or molded in a section of the housing or frame which forms a supporting or mounting ring member for the raceway ring, and this can be done in a die-casting machine, plastic molding machine, by the permanent mold method or the centrifugal mold method to produce an integral bearing ring construction which may be directly mounted and accurately located in the housing or frame, and having an insert raceway or track ring of the necessary hardness and toughness. This permits the use of softer and cheaper material for the cast or molded or otherwise formed housing or frame section forming the ring support, and the insert raceway ring of tough hardened steel or similar material can be cast or molded into this material or otherwise permanently bonded thereto and properly and accurately positioned in or bonded to the supporting material by the casting and molding operation, or bonded by some other means to a preformed housing or frame section comprising a supporting and mounting ring member, such for example as copper brazing in a controlled atmosphere. This construction eliminates a large number of chucking and finishing operations required in making and mounting the standard antifriction bearing, insuring greater accuracy with less difficulty and liability of error, particularly the proper locating of the raceway or track for the rolling elements with respect to the finished surfaces of the housing or frame and the cooperating elements mounted therein, giving a better and more reliable construction and one which can be manufactured and assembled at much less cost. This is particularly important as giving quiet, smooth and vibrationless operation at high speeds.

Thus the main housing section 121 of the generator or motor shown is provided with bored and finished supporting surfaces 126 and 127 accurately located and aligned with respect to the axis of the rotor and shaft to be used in the housing. The end section of the housing indicated at 128 is provided with complementary locating and mounting faces or surfaces 129 and 130. The section 128 forms an integral part of the antifriction bearing for the shaft, this bearing including a raceway or track ring 25, which forms a raceway or track 27 for the balls or other rolling elements 28. This ring 25 is mounted in and is permanently bonded to the section 128 of the housing or frame. It is ordinarily made of the special tough steel alloys now generally employed for the ring members of the standard ball and roller bearing, and which can be treated to give the necessary hardness to the surface on which the rolling elements roll.

These rings may be formed by any of the methods pointed out in connection with Figs. 1 and 3. This ring may be properly finished and hardened and then held in the proper location in the mold by suitable holding and locating means and the other material forming the backing and supporting material of the housing or frame member 128 is poured into the mold about the ring with suitable pressure. This material may be cast or molded about the ring in any suitable manner, such for example as in die-cast molds in die-casting machines, suitable molds in plastic molding machines, by casting in permanent molds, by casting by centrifugal mold methods, or powdered metal pressure molding or casting. It is preferred that the surface of the insert ring 25 at the opposite side from the rolling track or raceway for the balls or other rolling elements be knurled or otherwise roughened, as indicated at 29, so that the cast or molded material will run into the depressions in the knurled or roughened surface to form a better bond between the insert raceway ring and the backing up or mounting material. Thus the raceway or track ring is permanently bonded to the backing and supporting section so that it cannot be shifted or removed. Another way in which the ring may be mounted and permanently bonded to the backing and supporting ring section forming a section of the housing or frame is by preforming the section and securing the ring thereto through copper brazing in a controlled or neutral atmosphere, as described in the prior applications above noted and as illustrated in Fig. 14 of the present drawings.

The backing and supporting member 128 includes a circular ring portion 131 and the body portion 132 integral with the central ring portion 131. This body portion has the locating or mounting surfaces 129 and 130 (which may be in any plane of the part) accurately positioned and aligned with respect to the insert ring 25, and particularly the raceway or track surface 27 thereof, and this accurate relative location and alignment of the surfaces 129, 130 and 27 can be readily secured in the molding or casting operation with practically no finishing operation. In the final finishing operation the housing or frame section 128 can be clamped in the chuck or holder or against the table of the machine, locating it by means of one or both of the surfaces 129 and 130 and then the track or raceway surface 27 accurately ground to the desired finish and size. In this way the track surface may be radially located and finished in exact radial and axial concentric alignment with the mounting surfaces 129 and 130, as the finishing is done with a single chucking operation or set up. The assembled bearing and housing section 128 can be quickly and accurately mounted on the central housing or frame section 121 by merely seating the surfaces 129 and 130 on the supporting surfaces 126 and 127 and the sections clamped and secured together by any suitable means, such as the bolts or screws 133. Therefore when the section 128 is assembled with the section 121 it is automatically accurately located and aligned with the finished surfaces of the section 121 and the elements located and mounted therein, and particularly the raceway or track surface 27 is quickly and automatically accurately located and aligned with respect to the housing or frame within which it is mounted and thus the shaft is automatically accurately aligned and located.

The inner portion of the antifriction bearing comprises the insert ring 37 (which may be the same as the ring 25 only reversed) and the backing and supporting member 38 cast or molded about the ring 37 and permanently bonded thereto in the manner described in the applications above identified. This inner section is mounted on the shaft 123 and completes the inner portion of the antifriction bearing.

This construction eliminates the eccentricity and wobble troubles encountered with standard bearings as above described. The locating and mounting surfaces 129 and 130 are always exactly in perfect alignment with the bearing raceway or track 27 as they are on the same piece, machined in exactly the same machine setting in the same manner. The raceway of the inner ring 37 is always in perfect alignment with the bore 134. Seals 42 can be employed to hold lubricant in the bearing so that the construction becomes a sealed cartridge and needs practically no attention for thousands of hours of service. A sealed inlet for lubricant is shown at 42a. Costs can therefore be materially reduced to a point where it becomes possible to use two ball or antifriction bearings per generator or motor where only one could formerly be used. This is illustrated in Fig. 11, where two ball bearings are used on one generator. It is necessary to use a compressible element 135 at one end of the shaft to absorb expansion variables of the parts as well as part tolerance variation. This element may be a wave spring, rubber or other similar compressible part. The balls 28 are shown in the usual cage or retainer 43 such as used in standard ball and roller bearings, comprising for example two strips of steel stamped from sheet metal and formed and secured together by rivets or other suitable means (not shown) to retain the balls in proper alignment.

This process and construction uses the same basic function for its bimetallic and bimaterial construction as the present standardized antifriction bearing construction as far as sizes and materials of the raceway, balls and retaining elements are concerned. That is, no attempt is made to alter the function or performance of the balls or rolling elements.

The improved bearing steels of today make possible far greater load carrying capacity for a given bearing size load rating so successfully established and accepted by all industries over the entire world. These established sizes therefore do not require a bearing ring thickness as great as when the sizes were initially established. A small part of the standard sized ring may therefore be made of other material without affecting the proper raceway load carrying function. Thus in this construction the small balance (represented by the portion 131) of the standard section over that of the raceway ring is supplied by softer and more easily workable material yet fully capable of conservative support of a required load, making possible major reduction in the cost of fabrication of the bearing including such as cylindrical, needle, spherical, conical or tapered rollers as well as balls. However, the ring section 131 need not be limited merely to the thickness to fill out and bring the outside diameter to the standard roller bearing diameter for the size and load involved, as indicated in dotted lines 136, Fig. 11 (and also the other figures), although this would be done if the saving of material and weight is an important consideration. In the showing on the drawings this section 131 is shown considerably thicker to indicate how greater weight and strength may be secured if desired, as there is plenty of space surrounding the bearing for the extra material.

The insert ring 25 of hardened metal is made of a thickness at its thinnest point 45 to carry the rolling load as conservatively figured by the established formulas of Streibeck and Hertz for a standard solid one-piece bearing so that this insert ring is capable of carrying the normal rolling load independently of the backing or supporting member.

It will be seen that the insert ring 25 forming a raceway or track for the rolling elements is of less width than the supporting or backing member or section 131 so that the sides 137 of the insert ring are spaced inwardly from the sides 138 and 139 of the backing member. It will also be noted that the diameter of the face 140 of the insert ring on which the raceway or rolling surface 27 is located is of a different diameter from that of the adjacent surfaces 141 of the backing or supporting ring member 131 with which it is associated, so that this face of the insert ring is spaced above or inwardly of that of the backing member. This arrangement eliminates the necessity of accurately finishing and lining up the side surfaces 137 of the insert ring, doing away with a large number of chucking operations required in finishing the one-piece solid bearing now generally employed. The elimination of a large number of chucking operations thus greatly reduces the cost of manufacture, increases the percentage of bearings which are constructed to the proper dimensions, thus decreasing the percentage of rejected bearings, and secures the necessary accuracy with less difficulty.

Because the face 140 carrying the track or raceway is spaced above the adjacent surfaces 141 of the backing member a portion of each side of the insert ring is exposed and not covered by the metal or material of the backing member. These uncovered surfaces are important as providing gripping surfaces to be properly gripped and hold the insert ring in the die by suitable holding means during the casting and molding operations, and also for later grinding and finishing of the raceway. If the insert ring is merely slid or forced onto the die pin it is very apt not to be held in the proper position during the casting or molding operation because as soon as the hot metal or other material hits it, it is heated and expands faster than the large bulk of the die pin, and therefore the ring loosens on this pin and is liable to be tilted sideways and otherwise forced out of position by the pressure of the material or the metal forced into the mold. With this present construction the insert ring can be gripped and held in the mold by its opposite sides 137 with no danger of its being loosened by heating from the die casting metal or other material and then forced out of position by the pressure of this metal or other molding material.

Because the ring can be so gripped and held, either during molding or casting operations or for finishing of the raceway, a large number of chucking operations are avoided which are necessary in the solid or one-piece bearing now generally employed, and also required of the complicated multi-piece mounting now generally employed for mounting the standard bearing in the motor or generator housings, thus doing away with a large number of variables in the standard bearing and its mounting that cause such unsatisfactory performance as to lead to rejection by the customer. Basically, these variables are due to the many chucking operations required for the many step-by-step operations needed in finishing the bearing ring of the present standard methods of ball bearing manufacture, and also the variables and errors caused by the many chucking and finishing operations in making the multiple parts of the mounting for these bearings in the motor or generator housing. These errors or variables are cumulative, resulting in misalignment, cocking of the bearing wobble and eccentricity, etc. This also applies to all types of ball, roller and thrust bearings. It will be evident that the diameter surfaces of the rings must be parallel, that the ring surfaces must be parallel, and that the raceways must be parallel with both faces and diameter, and that all must be concentric (not eccentric) with each other, for uniform or successful bearing performance. If these qualities are not rigidly maintained, wobble of the rings, of the faces, of the diameters, or other errors of combinations of these faults will quickly cause bearing failure and wrecking of the bearing.

In the present construction, however, as indicated above, the backing up member 131 and the raceway ring 25 may form a standard proportioned bearing with the backing or outer section cast, molded or bonded to the raceway ring and forming in integral part of the section 128 of the housing or machine frame so that the mounting surfaces are exactly positioned and aligned with reference to the raceway surface for the rolling elements. This is a simple construction in which a large proportion of the finishing operation required in the usual construction of the bearing ring and mounting for the bearing in the housing are eliminated. At high speeds this invention provides a far greater degree of smoothness of operation as a great proportion of all factors of machine error, such for example as wobble and eccentricity, are entirely eliminated.

The bearing at the opposite end of the housing is substantially the same as that just described except that it may be of a lighter construction as the load at that end of the shaft is less, and it illustrates how the section of the housing or frame forming a part of the bearing may be made of different shapes to correspond with the machine or device, or that is, the specific application for which it is to be used. In this case the section of the housing or frame forming the outer member or backing up and supporting member of the bearing is indicated at 142, which has the accurately located and aligned locating and mounting surfaces 143 and 144 corresponding to the faces 130 and 129 of the member 128 and which seat on and cooperate with the accurately located and aligned surfaces 145 and 146 of the housing section 121 corresponding to surfaces 127 and 128 at the other end thereof. The antifriction bearing ring 25 is mounted in and permanently bonded to section 142 of the housing or frame the same as described in connection with the member 128 so that the surfaces 143 and 144 are accurately aligned and positioned with respect to the raceway 27 the same as previously described, and the central ring section 147 carrying this raceway ring corresponds to the section 131 of the member 128. Otherwise the construction is the same, may be made in the same manner and secures the same advantages.

In Fig. 13 is shown a slightly modified construction for the section of the housing or machine frame forming a part of the bearing corresponding to the members 128 and 142. In this case instead of the section 148 of the housing or frame forming a part of the bearing being in one integral piece, it is made in two sections comprising an outer or ring section 149 and an inner ring section 150. The outer ring section has the accurately located and aligned locating and mounting surfaces 129 and 130 to seat on and cooperate with the surfaces 126 and 127 of the housing in mounting this section in the other housing section. It also has accurately located and aligned surfaces 151 and 152 cooperating with similarly accurately located and aligned surfaces 153 and 154 on the inner member or section 150, these surfaces being either directly on the body portion of the member or on the flange 155 integral with the central ring portion 160. This portion 160 corresponds to the portion 131 of the member 128 and carries the raceway ring 25 and is permanently bonded to it the same as described in connection with Fig. 1. The sections 149 and 150 are cast, molded or otherwise formed in exactly the same manner as described in connection with the member 128 and perform the same function. This is a great improvement over the standard mounting for the standard solid bearing but does introduce a possible additional error over the construction of Fig. 11 because of the extra surfaces to be accurately located between the two sections 149 and 150. These sections are secured together by any suitable means such as the screws 161 and the assembled bearing structure is secured to the other sections of the housing or frame by any suitable means, such for example as the bolts 133, as previously described. Mounting ears or lugs for mounting the motor generator or similar device on a support or the frame of an automobile may be formed integral with this section of the housing, as indicated at 161, and it may have an opening 163 for the mounting bolts.

In Fig. 14 is shown a further modification of the construction of the section of the housing or frame forming the antifriction bearing. The complete assembly 164 corresponds to the assembly 128 and is used in the same manner. It has the locating and mounting surfaces 130 and 129 accurately aligned and positioned, but instead of being a cast or molded construction the member 165 is blanked and drawn or formed from sheet metal of a suitable gauge, this operation also forming the ring section 166 corresponding to the section 131 of the member 128 in which the insert ring 25 is mounted and for which it forms a backing up and supporting member. It is also permanently bonded to the ring 25, but as the member 165, 166 is preformed it is bonded to the ring 25 preferably by copper brazing in a controlled or neutral atmosphere. This permanently bonds the ring to the backing up and supporting member so that they are in effect one integral structure. The ring 25 is narrower than the section 166 so that its side walls 137 are spaced inwardly of the side walls 167 and 168 of the backing up and supporting member. Also the face 140 being of less diameter than the inner face 169 is located above or inwardly of this inner face 169, thus forming shoulders by which the ring 25 may be gripped and held during the assembling and finishing operations to accurately locate and align the raceway surface 27 with respect to the surfaces 129 and 130 so that when the assembly is mounted in the section 121 of the housing or frame the raceway or track surface 27 is accurately positioned and aligned with respect to the shaft and other elements, as previously described in connection with Fig. 11. The assembled section is secured to the main section or frame in the same manner, as for example by the bolts 133, and to secure the proper strength and length of tapped opening separate bosses 170 may be brazed to the member 165. Similarly a preformed mounting lug 171 may be brazed to the member 165 and 172 and the proper thickness of this lug be secured by brazing an additional member 173 to the member 172.

In Figs. 15 and 16 are shown examples of how the mounting flange and end frame may be shaped to carry out particular designs for the generator, motor or other machine housing and also the locating and mounting surfaces 129 and 130 may be located laterally spaced practically any desired distance from the plane of the raceway ring and raceway surface. That is, the supporting surfaces are not only remote from the bearing location as in Figs. 11 to 14, but they are also located in planes at a considerable distance laterally of the plane of the bearing. In other words, the supporting surfaces are not directly at the bearing location. The remote type of supporting surface assures exact alignment of the raceway surface 27 with the supporting surface.

In Fig. 15 the flange and end frame 174 is in the form of an end bell for the housing 121.

In Fig. 16 the flange and end frame 175 shows how this end frame may be shaped to continue the streamlined form of the motor or generator frame or housing 176. Streamlined motor frames or housings require offset end frames to allow for brush holders and so forth, and this type of end frame is effectively provided by the construction shown. The outer end of the frame may be closed by a cap 177 to protect the bearing from dirt and moisture. The cap may be secured by any suitable means, such for example as threading it into the frame as indicated at 178. The frames 174 and 175 may be secured to the housing by any suitable means, such for example as the bolts 133 shown in Fig. 11 but omitted from Figs. 15 and 16.

Thus in each construction the insert raceway or track rings may be of tough hardened steel or other suitable hardened metal. The balance of the bearing members consisting of the backing up ring section and the integral mounting flange and the housing or frame member can be made of softer and more readily workable materials than the tough hard alloy metal required for the insert raceway ring, as the load from these insert rings is distributed over large areas. Thus the backing and supporting material for the insert raceway ring to support and assist in preventing distortion of these rings as well as hold them accurately in the proper position can be of a softer alloy or other molded or cast material. This backing material may be of die casting materials and alloys such for example as zinc, magnesium, aluminum, brass or bronze alloys in common use which have excellent physical properties for this compression service, and the backing-up ring members can be made in a die-casting machine, plastic molding machine, by permanent mold method, or the centrifugal mold method, etc.

The powder molding methods are particularly adapted for making the backing member and forming it about the raceway ring. This includes powder metallurgy and powder plastics in the many ways of applying them. Thus for example they may include their use as pure powders handled under very high pressures as in powder metallurgy, or the molding of metal powders mixed with a proper percentage of a suitable binder under great pressure in molds, the binder acting as a bond for the metal particles. The use of metallic powders has particular value in this invention to insure more rapid conduction of heat away from the bearing under heavy operating conditions of load or speed than would be possible with non-metallic plastics or similar materials.

To produce the backing up members having inserted raceway rings the insert rings can be suitably held and accurately positioned in the dies or mold and the liquid or powdered metal poured or cast about them or molded under pressure to produce a finished ring formed accurately to size and the mounting surfaces accurately located and aligned, so that only sizing operations may be necessary.

It is to be noted that this two-material ring construction wherein the raceway surface provides a very hard standard surface for the balls or rollers of any type of bearing, may have the backing ring or section of very light material cast, molded or bonded to the raceway ring, assuring the very lightest possible weight for such construction applications as aircraft, as well as decrease in the time required to manufacture and the amount of steel required in the manufacture, thereby conserving vital materials which may be required for other purposes.

I am, however, not limited to the use of metal for the backing-up or mounting rings or sections, but may use other molding materials, as liquids, powders or plastics under high pressure or by centrifugal force. Thus in addition to the metals and the alloys mentioned may be used acrylic, cellulose acetate, phenolic resins, urea, vinyl, etc., among the various molding plastics, and the mild soft steels, hard steel alloys, manganese bronzes or other high melting point alloys for the centrifugal permanent mold casting method, and for powdered metals molded under high pressure either with or without the binder.

The backing and supporting material brings the bearing to standard size and the raceway ring is permanently bonded to it or inseparably mounted on it. The terms "bonded" or "inseparably mounted" include casting, molding, or forming the backing material about or against the ring, controlled atmosphere brazing, brazing, sweating and soldering, or otherwise bonding or connecting so they are inseparable in use and in effect one piece.

Throughout the specification and claims I have used the terms "casting" and "molding" as practically synonymous, as castings are formed and shaped in molds and therefore casting is broadly a molding operation. Also, shaping and molding such materials as the non-ferrous plastics and powdered metal may be broadly called a casting operation as they are shaped in molds.

In all cases the backing material is of a degree of hardness to support the load from the raceway ring without change from its repose dimensions as contrasted with a yieldable backing for vibration dampening applications.

Although hardened steel has been mentioned as the material that would probably be most generally used for the insert raceway ring, it is to be understood that the invention is not limited to the use of this material. Thus, for example, stainless steel is often required, or the use of bronze or glass may be required as materials for special jobs, such as would be needed on process industries in the presence of acid in gaseous or liquid form.

Having thus set forth the nature of my invention, what I claim is:

1. A device of the character described comprising a bimaterial unitary structure including a supporting and mounting member comprising a central ring portion and an integral flange extending radially therefrom forming a supporting means for the member, a single one piece preformed continuous hardened metal anti-friction bearing raceway ring mounted in the ring portion forming a track for the rolling elements and of sufficient thickness to carry the normal rolling load, said supporting and mounting member being of more workable material than the raceway ring but of a degree of hardness to withstand the load without materially changing its repose dimensions, said flange being provided with a locating and mounting surface adapted to seat on a supporting surface on a supporting housing or frame to locate said ring in the housing or frame, and said ring having an outer surface permanently bonded to the material of the ring portion to hold it permanently in a given position in the supporting member whereby the track surface may be finished with respect to said locating and mounting surface after mounting of the ring in the supporting member and bonding it thereto so that the track surface may be brought into exact axial and concentric alignment with the locating and mounting surface.

2. A device of the character described comprising a bimetal unitary structure including a supporting and mounting member comprising a central ring portion and an integral flange extending radially therefrom forming a supporting means for the member, a single one piece preformed continuous hardened metal anti-friction bearing raceway ring mounted in the ring portion forming a track for the rolling elements and of sufficient thickness to carry the normal rolling load, said supporting and mounting member being of different metal from the ring pressure cast to substantially finished size against the ring and of a degree of hardness to withstand the load without materially changing its repose dimensions, said flange being provided with a locating and mounting surface adapted to seat on a supporting surface on a supporting housing or frame to locate said ring in the housing or frame, and said ring having an outer surface permanently bonded to the cast metal of the supporting and mounting member to hold it permanently in a given position in the supporting member whereby the track surface may be finished with respect to said locating and mounting surface after casting of the supporting member about the ring and bonding of the ring to said member so that the track surface may be located in exact axial and concentric alignment with the locating and mounting surface.

3. A device of the character described comprising a bimetal unitary structure including a supporting and mounting member made of formed metal and comprising a central ring portion and an integral flange extending radially therefrom forming a supporting means for the member, a single one piece preformed continuous hardened metal anti-friction bearing raceway ring mounted in the ring portion and permanently bonded thereto by copper bracing in a controlled atmosphere, said ring forming a track for the rolling elements and being of sufficient thickness to carry the normal rolling load, said supporting and mounting member being of a softer and more workable metal than the raceway ring but of a degree of hardness to withstand the load without materially changing its repose dimensions, said flange being provided with a locating and mounting surface adapted to seat on a supporting surface on a supporting housing or frame to locate said ring in the housing or frame, and said raceway ring being of less width than the ring portion so that its side walls are spaced inwardly of the opposite side walls of the ring portion and the diameter of its face having the track being different from that of the adjacent face of the ring portion so that it is spaced above this latter face and the side walls of the ring are exposed.

4. A device of the character described comprising a bimetal unitary structure including a supporting and mounting member comprising a central ring portion and an integral flange extending radially therefrom forming a supporting means for the member, a single one piece preformed continuous hardened metal anti-friction bearing raceway ring mounted in the ring portion forming a track for the rolling elements and being of sufficient thickness to carry the normal rolling load, said supporting and mounting member being of different and softer metal from the ring but of a degree of hardness to withstand the load without materially changing its repose dimensions, said flange being provided with a plane locating and mounting surface extending transversely of the axis of the ring adapted to seat on a supporting surface on a supporting housing or frame to locate said ring in the housing or frame, and said ring having an outer surface permanently bonded to the material of the ring portion to hold it permanently in a given position in the supporting member whereby the track surface may be finished with respect to said locating and mounting surface after mounting of the ring in the supporting member and bonding it thereto so that the track surface may be located in exact axial and concentric alignment with the locating and mounting surface.

5. In a device of the character described including a housing or frame, one portion of the housing or frame having an opening therein for passage of a shaft and provided with a plane supporting surface about the opening and extending transversely of the shaft, a supporting and mounting member comprising a central ring portion and an integral flange extending radially therefrom forming a supporting means for the member, a single one piece preformed continuous hardened metal anti-friction bearing raceway ring mounted in the ring portion forming a track for the rolling elements and of sufficient thickness to carry the normal rolling load, said supporting and mounting member being of different material from the raceway ring but of a degree of hardness to withstand the load without materially changing its repose dimensions, said flange being provided with a locating and mounting surface seated on said supporting surface to locate the raceway ring in the housing or frame, said ring having an outer surface permanently bonded to the material of the ring portion to hold it permanently in a given position in the supporting member whereby the track surface may be finished with respect to said locating and mounting surface after mounting of the ring in the supporting member and bonding it thereto so that the track surface may be located in exact axial and concentric alignment with the locating and mounting surface, and means for securing the flange to the housing or frame.

6. A device of the character described comprising a bimetal unitary structure including a supporting and mounting member comprising a central ring portion and an integral flange extending radially therefrom forming a supporting means for the member, a single one piece preformed continuous hardened metal anti-friction bearing raceway ring mounted in the ring portion forming a track for the rolling elements and of sufficient thickness to carry the normal rolling load, said supporting and mounting member being of different metal from the ring pressure cast to substantially finished size against the ring and of a degree of hardness to withstand the load without materially changing its repose dimensions, said flange being provided with a locating and mounting surface adapted to seat on a supporting surface on a supporting housing or frame to locate said ring in the housing or frame, said raceway ring being of less width than the ring portion of the mounting member so that its side walls are spaced inwardly of the side walls of said ring portion, and said raceway ring having an outer surface permanently bonded to the cast metal of the supporting and mounting member to hold it permanently in a given position in the supporting member whereby the track surface may be finished with respect to said locating and mounting surface after casting of the supporting member about the ring and bonding of the ring to said member so that the track surface may be located in exact axial and concentric alignment with the locating and mounting surface.

7. A device of the character described comprising a bimaterial unitary substantially integral structure including a frame of the size and shape of the end frame of a motor or housing and comprising a body portion and a central ring portion integral with the body portion, a single one piece preformed continuous hardened metal anti-friction bearing raceway ring mounted in the ring portion of the frame forming a track for the rolling elements and of sufficient thickness to carry the normal rolling load, said frame being of a more workable material than said ring but of a degree of hardness to withstand the load without materially changing its repose dimensions, said body portion extending outwardly away from the ring and shaped to form the end frame and being provided with a locating and mounting surface adjacent the outer periphery thereof spaced radially remote from the central ring portion adapted to seat on a supporting surface on the body section of a housing to mount the frame on the housing so as to form the end structure thereof and also to mount and locate the raceway ring in the housing, and said raceway ring having an outer surface permanently bonded to the material of the frame to hold it permanently in a given position in the frame whereby the track surface may be finished with respect to the locating and mounting surface after mounting of the ring in the frame and bonding it thereto so that the track surface may be brought into exact axial and concentric alignment with the locating and mounting surface.

8. A device of the character described comprising a bimetal unitary substantially integral structure including a frame of the size and shape of the end frame of a motor or housing and comprising a ring portion and a body portion integral therewith and extending laterally outwardly therefrom and shaped to form the end frame, a single one piece preformed continuous hardened metal anti-friction bearing raceway ring mounted in the ring portion of the frame forming a track for the rolling elements and of sufficient thickness to carry the normal rolling load, said frame being of different metal from the ring pressure cast to substantially finished size against the ring and of a degree of hardness to withstand the load without materially changing its repose dimensions, said body portion being provided with a locating and mounting surface spaced radially remote from the ring and adjacent the outer periphery of the frame adapted to seat on a supporting surface on the body section of a housing to mount the frame on the housing so as to form the end structure thereof and also to mount and locate the raceway ring in the housing, and said raceway ring having an outer surface permanently bonded to the material of the frame to hold it permanently in a given position in the frame whereby the track surface may be finished with respect to the locating and mounting surface after mounting of the ring in the frame and bonding it thereto so that the track surface may be located in exact axial and concentric alignment with the locating and mounting surface.

9. A device of the character described comprising a bimetal unitary substantially integral structure including a frame of the size and shape of the end frame of a motor or housing and comprising a ring portion and a body portion integral therewith and extending laterally outwardly therefrom and shaped to form the end frame, a single one piece preformed continuous hardened metal anti-friction bearing raceway ring mounted in the ring portion of the frame forming a track for the rolling elements and of sufficient thickness to carry the normal rolling load, said frame being made of formed metal and of a degree of hardness to withstand the load without materially changing its repose dimensions, said body portion being provided with a locating and mounting surface adjacent the outer periphery thereof spaced radially remote from the ring portion adapted to seat on a supporting surface on the body section of a housing to mount the frame on the housing so as to form the end structure thereof and also to mount and locate the raceway ring in the housing, said raceway ring having an outer surface permanently bonded to the frame by copper brazing in a controlled atmosphere to hold it permanently in a given position in the frame whereby the track surface may be finished with respect to the locating and mounting surface after mounting of the ring in the frame and bonding it thereto so that the track surface may be brought into exact axial and concentric alignment with the locating and mounting surface.

10. A device of the character described comprising a bimetal unitary substantially integral structure including a frame of the size and shape of the end frame of a motor or housing and comprising a ring portion and a body portion integral therewith and extending laterally outwardly therefrom shaped to form the end frame, a single one piece preformed continuous hardened metal anti-friction bearing raceway ring mounted in the ring portion of the frame forming a track for the rolling elements and of sufficient thickness to carry the normal rolling load, said frame being formed of a different and softer metal from the ring but of a degree of hardness to withstand the load without materially changing its repose dimensions, said frame being of a greater width than the ring and the diameter of the surface of the ring having the track being different from that of the adjacent surface of the ring portion of the frame so that it is spaced above this latter surface, said body portion being provided with a locating and mounting surface located radially remote from the ring and adjacent the outer periphery of the frame adapted to seat on a supporting surface on the body section of a housing to mount the frame on the housing so as to form the end structure thereof and also to mount and locate the raceway ring in the housing, and said raceway ring having an outer surface permanently bonded to the material of the frame to hold it permanently in a given position in the frame.

11. A device of the character described comprising a housing including a body section and an end section, a shaft within the housing, said body section being provided with a plane supporting surface extending transversely of the shaft, said end section comprising a bimaterial unitary substantially integral structure including a frame comprising a ring portion and a body portion integral therewith and extending laterally outwardly therefrom and shaped to form the end frame, a single one piece preformed continuous hardened metal anti-friction bearing raceway ring mounted in the ring portion of the frame forming a track for the rolling elements and of sufficient thickness to carry the normal rolling load, said frame comprising a supporting member for the ring and being of different material pressure cast against the ring but of a degree of hardness to withstand the load without materially changing its repose dimensions, said body portion of the frame being provided with a locating and mounting surface adjacent the outer periphery thereof spaced radially remote from the ring portion and seated on said supporting surface on the body section of the housing to mount the end section on the housing so that it forms the end structure thereof and also to mount and locate the raceway ring in the housing, said raceway ring having an outer surface permanently bonded to the material of the frame to hold it permanently in a given position in said frame whereby the track surface may be finished with respect to the locating and mounting surface after mounting the ring in the frame and bonding it thereto so that the track surface may be brought into exact axial and concentric alignment with the locating and mounting face, and means for securing the end section to the body section.

12. A device of the character described comprising a housing including a body section and an end section, a shaft within the housing, said body section being provided with adjacent supporting surfaces at right angles to each other and extending axially and radially with respect to the shaft, said end section comprising a bimetal unitary substantially integral structure including a frame comprising a ring portion and a body portion integral therewith and extending laterally outwardly therefrom and shaped to form the end frame, a single one piece preformed continuous hardened metal anti-friction bearing raceway ring mounted in the ring portion of the frame forming a track for the rolling elements and of sufficient thickness to carry the normal rolling load, said frame comprising a supporting member for the ring and of different metal but of a degree of hardness to withstand the load without materially changing its repose dimensions, the track ring being of less width than the ring portion of the frame so that its side walls are spaced inwardly of the side walls of said portion and the diameter of its face having the track being less than that of the corresponding embracing face of the ring portion so that it is spaced inwardly of this face, said body portion of the frame being provided with axial and radial locating faces at right angles to each other located radially remote from the ring and seated on the supporting surfaces of the body section to mount the frame on this section so that it forms the end section of the housing and also to mount and locate the raceway ring in position in the housing, said raceway ring having an outer surface permanently bonded to the material of the frame to hold it permanently in a given position in the frame, and means for securing the end section to the body section.

GEORGE H. KENDALL.